Sept. 24, 1929.  G. H. REIMER  1,729,127
DUSTPAN
Filed Dec. 29, 1927
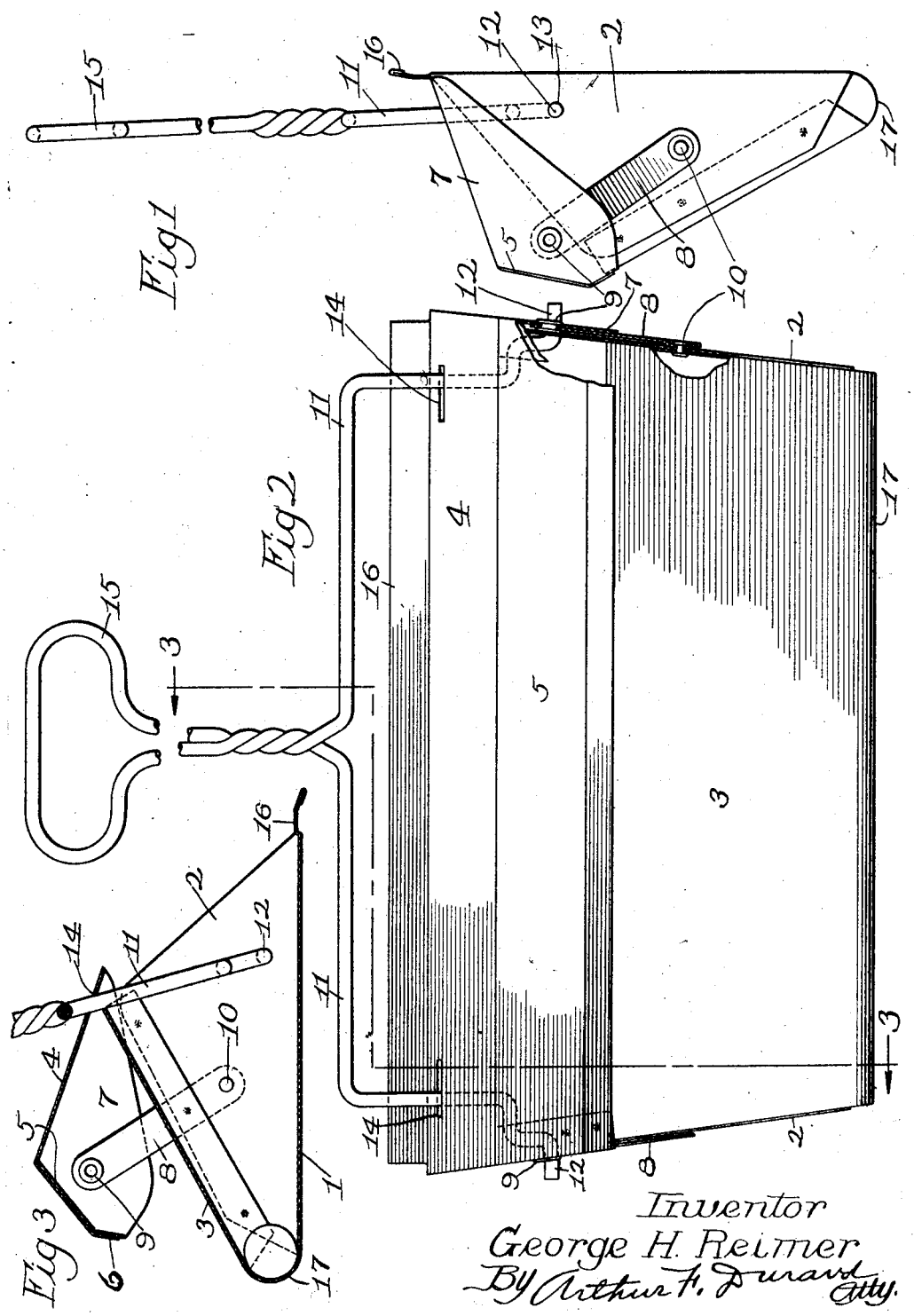
Inventor
George H. Reimer
By Arthur F. Durand Atty.

Patented Sept. 24, 1929

1,729,127

UNITED STATES PATENT OFFICE

GEORGE H. REIMER, OF FULTON, ILLINOIS, ASSIGNOR TO PATENT NOVELTY COMPANY, OF FULTON, ILLINOIS, A CORPORATION OF ILLINOIS

DUSTPAN

Application filed December 29, 1927. Serial No. 243,238.

This invention relates to dustpans, and more particularly to those which have automatic tilting bodies with hoods, whereby after the sweepings are within the dustpan, it can then be raised by means of the handle and caused to automatically tilt into position to automatically close the hood.

Generally stated, the object of the invention is to provide a novel and improved construction whereby both the hood and the handle are pivotally connected with the body of the dustpan in such a manner that they easily co-operate for the required purpose of automatically opening and closing the hood, so that when the dustpan is lowered on to the floor and tilted into operative position the hood will be opened, by displacement thereof backward over the upper wall of the dustpan body, and whereby the hood will be automatically closed when the dustpan is lifted from the floor, the hood having sliding engagement with the two arms of the bail with which the handle is rigid.

Another object is to provide a novel and improved construction and arrangement whereby the handle and the bail rigid therewith are easily disconnected from the dustpan.

It is also an object to avoid the use of certain features and combinations heretofore considered necessary in the construction of dustpans of this kind.

To the foregoing and other useful ends, the invention consists in the matters hereinafter set forth and claimed, and shown in the accompanying drawings, in which,—

Fig. 1 is a side elevation of a dustpan embodying the principles of the invention, showing the same in the position that it occupies when lifted from the floor.

Fig. 2 is a front elevation of the dustpan shown in Fig. 1.

Fig. 3 is a vertical section on line 3—3 in Fig. 2, showing the dustpan and its automatic hood in the positions which they occupy when the dustpan is in use on the floor.

As thus illustrated, the invention comprises the sheet-metal dustpan body having a bottom wall 1, side walls 2 and a top wall 3, the walls 2 being tapered to the rear, and the walls 1 and 3 converging to the rear rounded edge of the dustpan body, as shown, leaving a wide opening between the front edges of the upper and lower walls. The automatic hood comprises the top walls 4, and 6, which are rigid with the side walls 7, being tapered toward the front, the general formation of the sheet-metal hood being such that it closes the wide front opening of the dustpan body when the hood is in the position shown in Fig. 1 of the drawings. This hood is connected by links 8 with the dustpan body, being pivoted at 9 on the hood and at 10 on the body, whereby the lower portions of these links are exposed at the sides of the body, while the upper portions of the links are enclosed within the hood. The springy or resilient wire bail 11 has end portions 12 which are inserted through openings 13 in the side walls of the body, while the two arms of the bail are arranged to extend through the slots 14 in the wall 4 of the hood. With this arrangement, and by springing the two arms of the bail toward each other, the bail portions 12 can be disengaged from the openings 13 in the side walls of the body, and the bail can be removed through the slots 14 of the hood. The handle 15, it will be seen, is also of wire, and is preferably integral with the bail 11, but the handle and the bail may be united or connected together in any suitable or desired manner.

Preferably, it will be seen that the dustpan body has a front lip 16 to facilitate sweeping into the dustpan, and the rear edge of the dustpan is rounded to provide a heel 17, so to speak, which can slide forward on the floor during the initial upward movement of the dustpan when it is lifted by its handle.

With the foregoing construction and arrangement, which is illustrative of one form of the invention, it is obvious that the hood will automatically open and close when the dustpan is lowered on to the floor and thereafter lifted upward. When the dustpan is in the hand of the user, and is hanging down and not touching the floor, the body of the dustpan and the hood thereof will automatically assume the position shown in Fig. 1 of the drawings, and in such condition the hood is closed. However, when the dustpan is lowered on to the floor, the body thereof will tilt until its bottom wall 1 is resting on the floor, as shown in Fig. 3 of the drawings, and in such condition the hood is open and in the position shown, thus leaving the wide front opening of the dustpan open to receive the sweepings. For the purpose of storage or for the purpose of shipment, the handle and bail can be detached from the body of the dustpan, and from the hood, in the manner previously explained, and the bail can be easily re-attached by inserting its arms through the slots 14 and by springing the end portions 12 into the openings 13 in the side walls of the dustpan body.

Without disclaiming anything, and without prejudice to any novelty disclosed, what I claim as my invention is:

1. In a dustpan, a body to receive the sweepings, an automatic hood, links pivoted on the sides of the hood and body and connecting said hood to said body, whereby the hood has one position for closing the mouth of the dustpan body, and has another position over the dustpan body and back of said mouth when the dustpan is in use on the floor, in combination with a handle and connecting means therefor pivoted on the body and in engagement with the hood, with said connecting means operatively engaging the hood to automatically cause said hood to assume said closed position when the dustpan is lifted from the floor and to cause said hood automatically to assume said open position when the dustpan is lowered and tilted into operative position on the floor.

2. A structure as specified in claim 1, said connecting means comprising a bail having two arms the end portions of which are pivotally connected with the said walls of the dustpan body, said hood having openings for the two arms of said bail.

3. A structure as specified in claim 1, said connecting means comprising a bail having two arms the end portions of which are pivotally connected with the side walls of the dustpan body, said hood having openings for the two arms of said bail, said openings being slots, and said arms being flexible to move in said slots and thereby disengage the end portions of the bail from the dustpan body, which end portions of the bail are of a size and shape to pass freely through said slots.

4. In a dustpan, the combination of a body having a mouth to receive the sweepings, an automatic hood having its side walls suitably connected to said body, operative to move into an open position over the body and away from the floor and out of reach of the sweepings to open said mouth, said hood having openings therein near the lower front edge thereof, the front and rear edges of the hood being free, a bail having its two arms extending through and sliding in said openings to pivotally engage the side walls of the dustpan body, inside thereof, and a handle rigid with said bail.

5. A structure as specified in claim 4, said hood having link connection pivoted at points thereon and pivoted at different points on said body, forming two parallel transverse axes about which the hood is movable, to permit the hood to assume a closed position when the dustpan is lifted from the floor and to automatically assume an open position when the dustpan is lowered on to the floor.

6. A structure as specified in claim 4, said hood having a movable connection with said body, which connection is inside of the side walls of the hood, permitting said hood to automatically assume a closed position when the dustpan is lifted from the floor with the body in position to hold all of the sweepings and to automatically assume an open position over the top wall of the dustpan body when the dustpan is lowered on to the floor.

7. In a dustpan, a body to receive the sweepings, an automatic hood, links connecting said hood to said body, whereby the hood has one position for closing the mouth of the dustpan body, and has another position over the dustpan body and back of said mouth when the dustpan is in use on the floor, in combination with a handle and means for pivotally connecting the handle with the body and in engagement with the hood, with said connecting means engaging the hood to automatically cause said hood to assume said closed position when the dustpan is lifted from the floor and to cause said hood automatically to assume said open position when the dustpan is lowered and tilted into operative position on the floor, said connecting means comprising a bail having two arms the end portions of which are pivotally connected with the side walls of the dustpan body, said hood having openings for the two arms of said bail, said openings being slots, and said arms being flexible to move in said slots and thereby disengage the end portions of the bail from the dustpan body, which end portions of the bail are of a size and shape to pass freely through said slots.

Specification signed this 24th day of December, 1927.

GEORGE H. REIMER.